(12) United States Patent
Butler

(10) Patent No.: US 10,703,266 B1
(45) Date of Patent: Jul. 7, 2020

(54) EMERGENCY VEHICLE FOLDABLE BARRIER ASSEMBLY

(71) Applicant: Phillip Butler, Paradise (CA)

(72) Inventor: Phillip Butler, Paradise (CA)

( * ) Notice: Subject to any disclaimer, the term of this patent is extended or adjusted under 35 U.S.C. 154(b) by 0 days.

(21) Appl. No.: 16/437,554

(22) Filed: Jun. 11, 2019

(51) Int. Cl.
| | |
|---|---|
| B60Q 7/02 | (2006.01) |
| E01F 9/615 | (2016.01) |
| E01F 9/646 | (2016.01) |
| E01F 9/662 | (2016.01) |
| B60Q 1/52 | (2006.01) |

(52) U.S. Cl.
CPC ............... B60Q 7/02 (2013.01); B60Q 1/52 (2013.01); E01F 9/617 (2016.02); E01F 9/646 (2016.02); E01F 9/662 (2016.02)

(58) Field of Classification Search
CPC ... B60Q 7/02; B60Q 1/52; E01F 9/617; E01F 9/646; E01F 9/662
See application file for complete search history.

(56) References Cited

U.S. PATENT DOCUMENTS

| | | | |
|---|---|---|---|
| 3,788,268 A | 1/1974 | Hiatt | |
| 4,825,192 A | 4/1989 | Wells | |
| 5,103,205 A * | 4/1992 | Halligan | B60Q 7/00 |
| | | | 116/48 |
| 5,281,948 A * | 1/1994 | Estrada | B60Q 1/50 |
| | | | 340/433 |
| 6,213,047 B1 | 4/2001 | Means | |
| 6,809,654 B2 | 10/2004 | Hudson | |
| D556,617 S | 12/2007 | Darolfi | |
| 8,933,817 B2 * | 1/2015 | Caudill | B60Q 7/00 |
| | | | 340/471 |
| 9,245,465 B1 | 1/2016 | Geyer | |
| 9,522,629 B2 | 12/2016 | Schloesser | |
| 10,179,538 B2 * | 1/2019 | Blask | B60Q 1/2696 |
| 2005/0072350 A1 * | 4/2005 | Aasgaard | B60Q 1/52 |
| | | | 116/259 |
| 2011/0285549 A1 * | 11/2011 | Destro | G08G 1/0955 |
| | | | 340/908 |
| 2012/0056757 A1 * | 3/2012 | Caudill | B60Q 1/52 |
| | | | 340/908 |
| 2017/0210284 A1 * | 7/2017 | Donan | B60Q 1/2692 |
| 2018/0147980 A1 * | 5/2018 | Blask | B60Q 1/2696 |

* cited by examiner

Primary Examiner — Sisay Yacob

(57) ABSTRACT

An emergency vehicle foldable barrier assembly for protecting law enforcement, emergency workers, and others near vehicles pulled over on the road shoulder includes a rear barrier apparatus and a side barrier apparatus. The rear barrier apparatus comprises a rear mounting plate and a rear hinge configured to mount to a trunk end of an emergency vehicle adjacent a driver's side. A rear barrier bar is coupled to the rear hinge and has a curved portion configured to conform to the curvature of the trunk end. A plurality of rear lights is coupled to the rear barrier bar. The side barrier apparatus comprises a side mounting plate and a side hinge configured to mount to the driver's side of the emergency vehicle proximal the trunk end. A side barrier bar is coupled to the side hinge. A plurality of side lights is coupled to the side barrier bar.

8 Claims, 6 Drawing Sheets

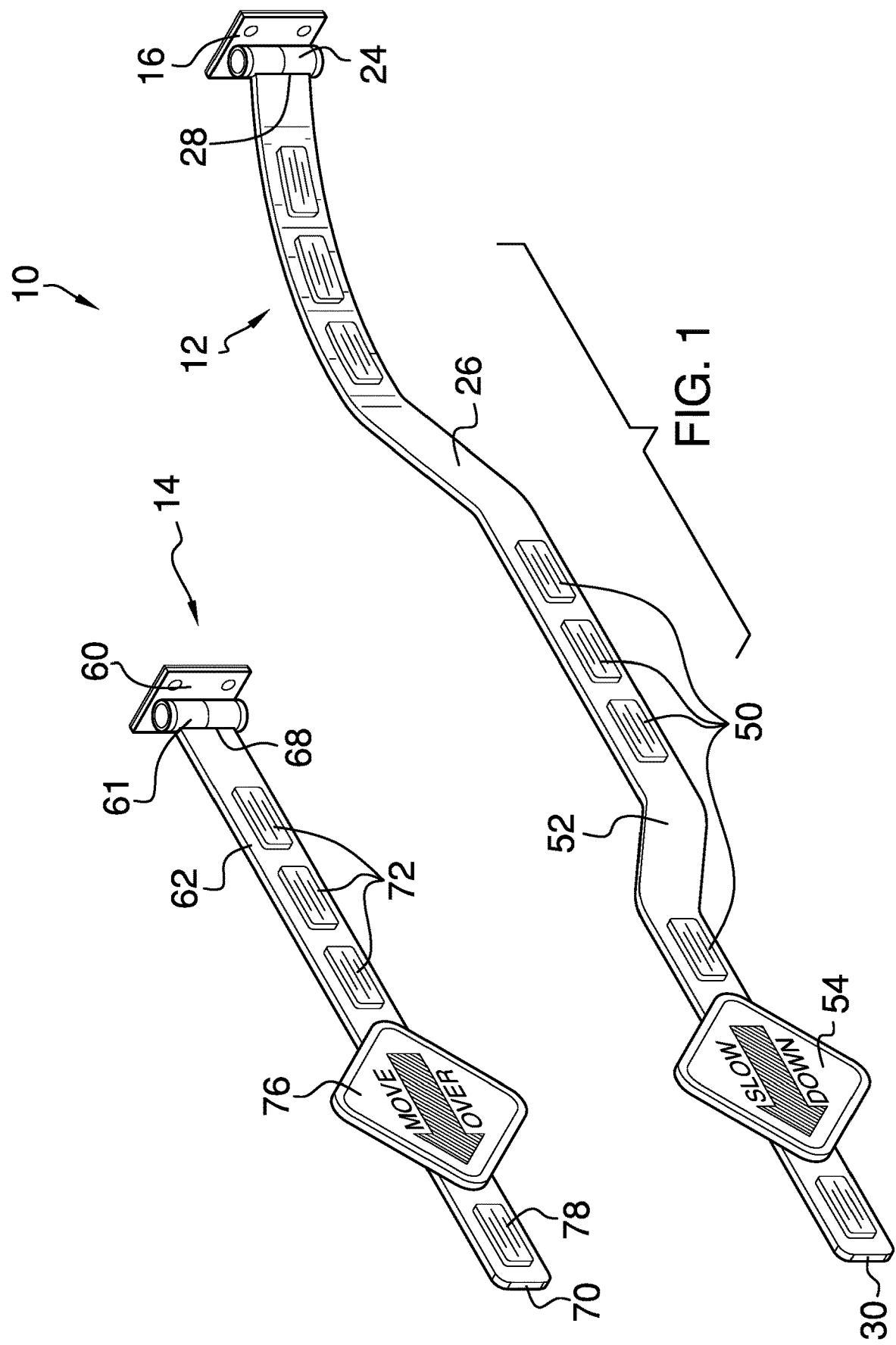

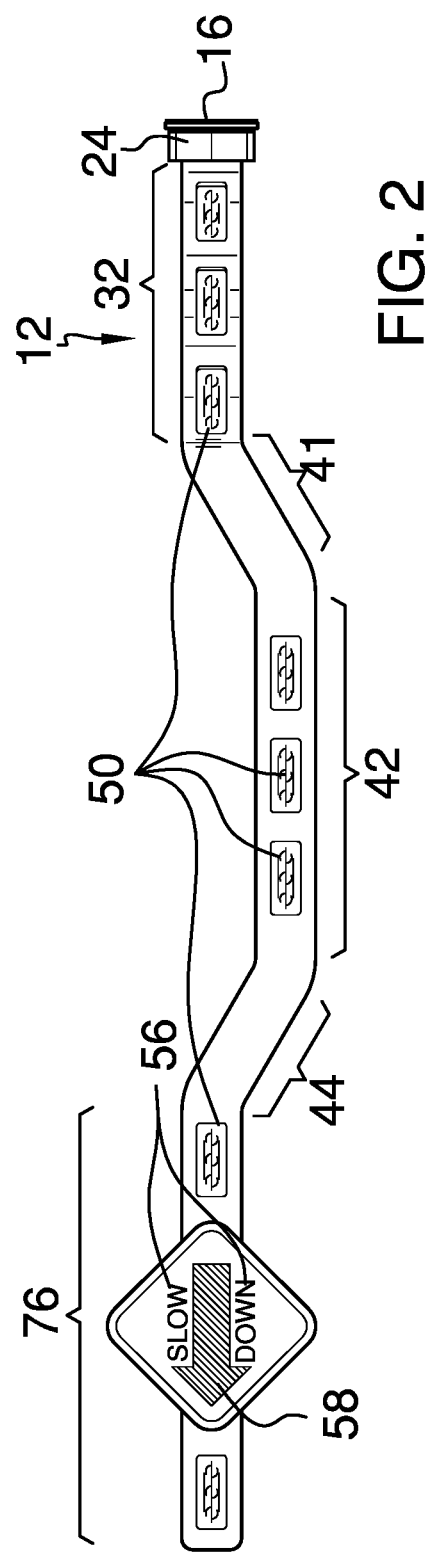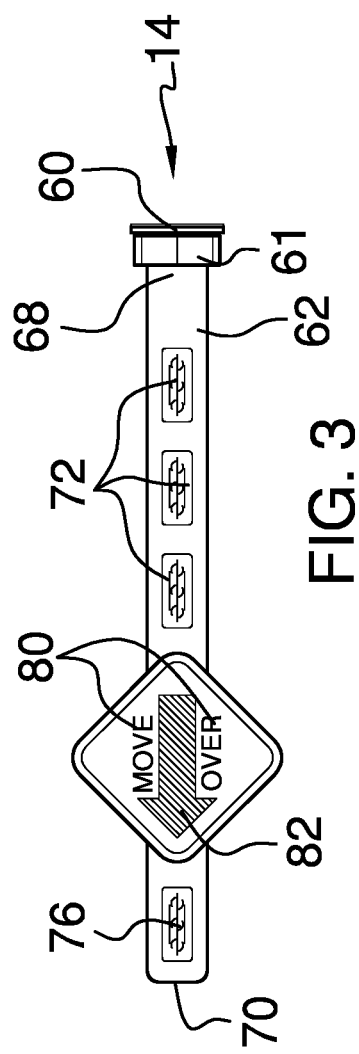

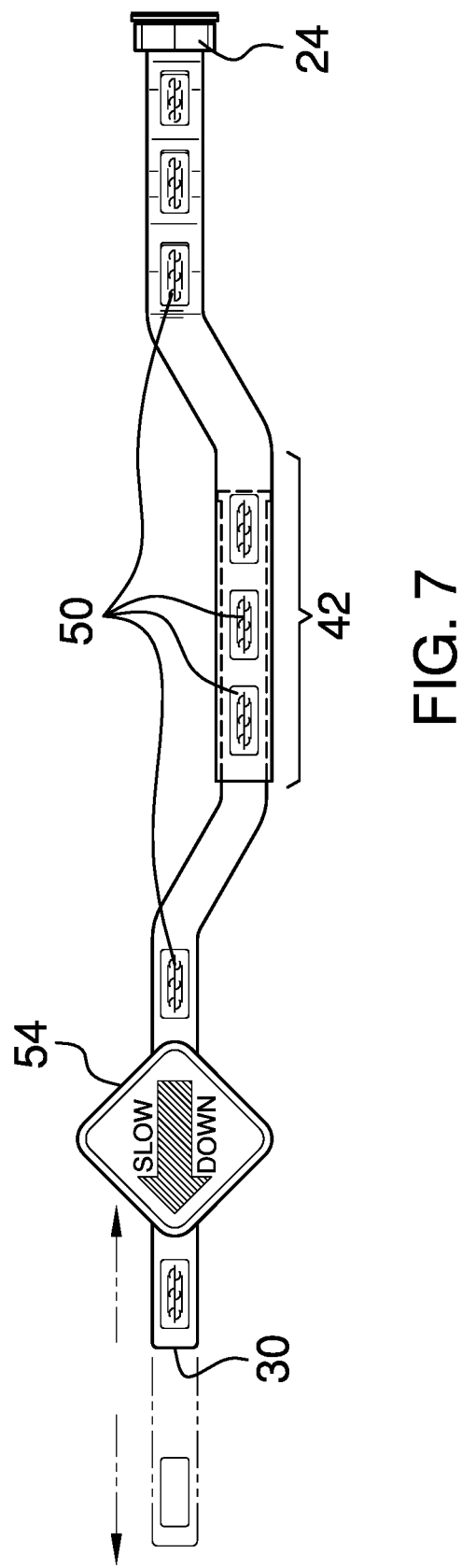

EMERGENCY VEHICLE FOLDABLE BARRIER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art including information disclosed under 37 CFR 1.97 and 1.98

The disclosure and prior art relates to emergency barriers and more particularly pertains to a new emergency barrier for protecting law enforcement, emergency workers, and other people around vehicles pulled over on the side of the road.

BRIEF SUMMARY OF THE INVENTION

An embodiment of the disclosure meets the needs presented above by generally comprising a rear barrier apparatus and a side barrier apparatus. The rear barrier apparatus comprises a rear mounting plate configured to mount to a trunk end of an emergency vehicle adjacent a driver's side. A rear hinge is coupled to the rear mounting plate and a rear barrier bar is coupled to the rear hinge. The rear barrier bar has a rear proximal end coupled to the rear hinge and a rear distal end. The rear barrier bar has a curved portion proximal the rear proximal end configured to conform to the curvature of the trunk end of the emergency vehicle and a planar portion extending from the curved portion to the rear distal end. A plurality of rear lights is coupled to a rear backside of the rear barrier bar and is configured to be in operational communication with an electrical system of the emergency vehicle. The side barrier apparatus comprises a side mounting plate configured to mount to the driver's side of the emergency vehicle proximal the trunk end. A side hinge is coupled to the side mounting plate and a side barrier bar is coupled to the side hinge. The side barrier bar has a side proximal end coupled to the side hinge and a side distal end. The side barrier bar has a length less than a length of the rear barrier bar. A plurality of side lights is coupled to a side backside of the side barrier bar and is configured to be in operational communication with the electrical system of the emergency vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is an isometric view of an emergency vehicle foldable barrier assembly according to an embodiment of the disclosure.

FIG. 2 is a rear elevation view of an embodiment of the disclosure.

FIG. 3 is a front elevation view of an embodiment of the disclosure.

FIG. 7 is a rear elevation view of an embodiment of the disclosure.

DETAILED DESCRIPTION OF THE INVENTION

Figure 4:
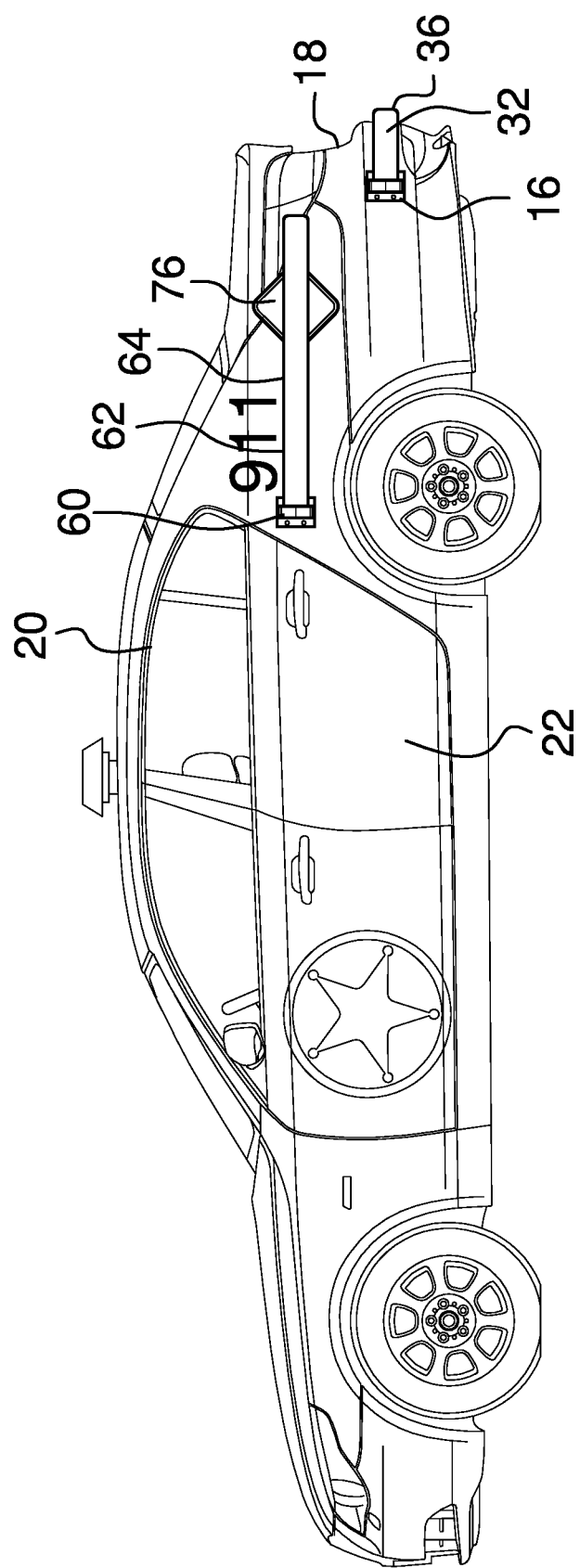
FIG. 4 is a side elevation in-use view of an embodiment of the disclosure.
Figure 5:
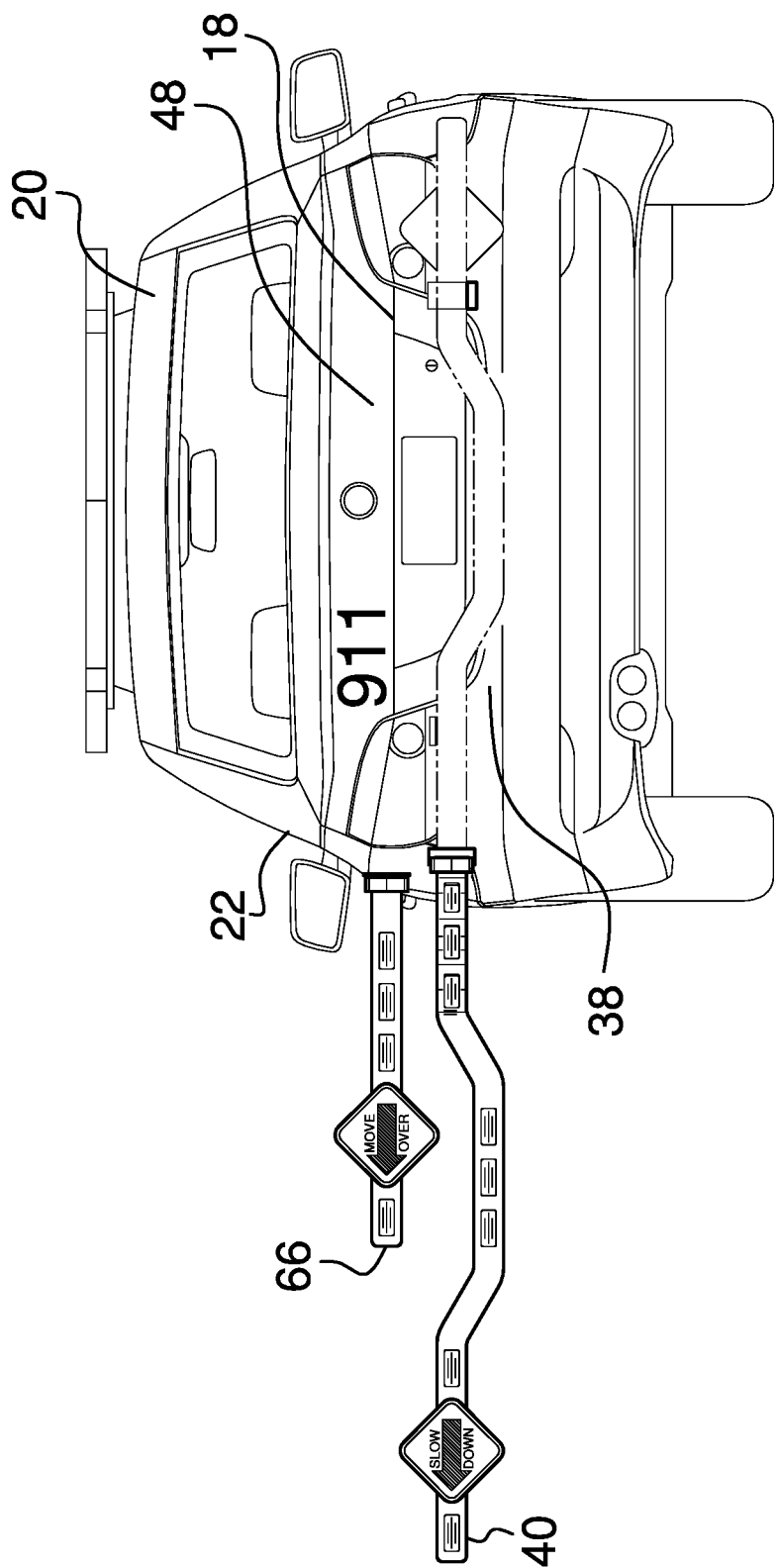
FIG. 5 is a rear elevation in-use view of an embodiment of the disclosure.
Figure 6:
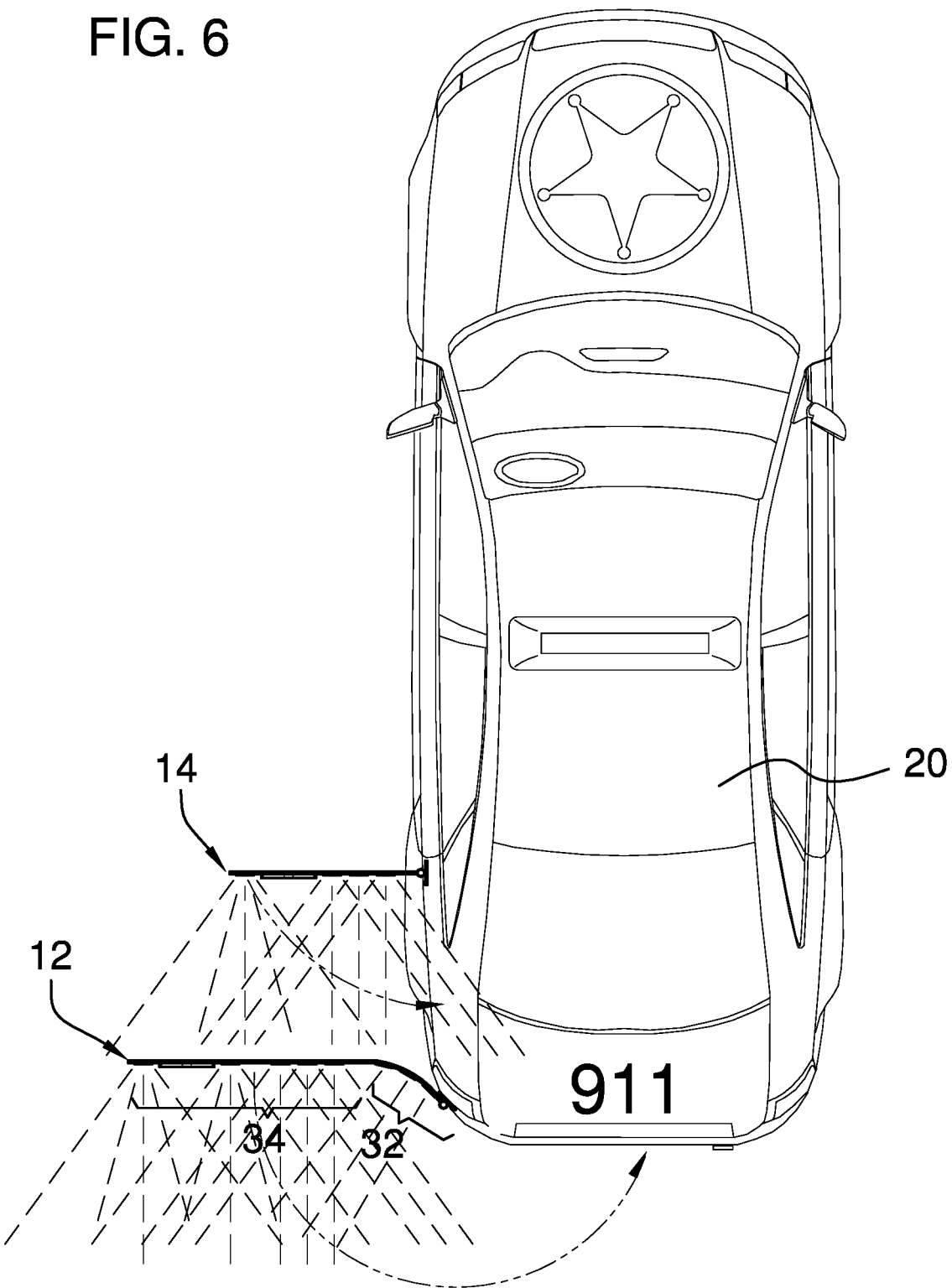
FIG. 6 is a top plan in-use view of an embodiment of the disclosure.

With reference now to the drawings, and in particular to FIGS. 1 through 7 thereof, a new emergency barrier embodying the principles and concepts of an embodiment of the disclosure and generally designated by the reference numeral 10 will be described.

As best illustrated in FIGS. 1 through 7, the emergency vehicle foldable barrier assembly 10 generally comprises a rear barrier apparatus 12 and a side barrier apparatus 14. The rear barrier apparatus 12 comprises a rear mounting plate 16 configured to mount to a trunk end 18 of an emergency vehicle 20 adjacent a driver's side 22 of the emergency vehicle. A rear hinge 24 is coupled to the rear mounting plate 16 and a rear barrier bar 26 coupled to the rear hinge 24. The rear barrier bar 26 has a rear proximal end 28 coupled to the rear hinge 24 and a rear distal end 30. The rear barrier bar 26 has a curved portion 32 proximal the rear proximal end 28 configured to conform to the curvature of the trunk end 18 of the emergency vehicle and a planar portion 34 extending from the curved portion 32 to the rear distal end 30. The rear hinge 24 allows the rear barrier bar 26 to move between a rear stored position 36 adjacent the trunk end 18 above a bumper 38 of the emergency vehicle 20 and an alternate rear extended position 40 extending perpendicularly from the driver's side 22 of the emergency vehicle. The planar portion 34 comprising a downward section 41 adjacent the curved portion 32, a lower section 42 extending horizontally from the downward section 41, an upward section 44 angling up from the lower section 42 and mirroring the downward section 41, and an end section 46 extending horizontally from the upward section 44. The downward section 41, the lower section 42, and the upward section 44 prevent the rear barrier bar 26 from interfering with a trunk 48 of the emergency vehicle 20. The lower section 42 may be telescopable to allow the rear barrier bar 26 to extend. A plurality of rectangular rear lights 50 is coupled to the rear barrier bar 26. The rear lights 50 are coupled to a rear backside 52 of the rear barrier bar and are configured to be in operational communication with an electrical system of the emergency vehicle 20. In the rear extended position 40 the plurality of rear lights 50 thus face back towards oncoming traffic and in the rear stored position 36 the rear lights 50 are protected against the trunk end 18 of the emergency vehicle 20. The plurality of rear lights 50 may comprise three rear lights 50 coupled to the curved portion 32, three rear lights 50 coupled to the lower section 42, and two rear lights 50 coupled to the end section 46. A rear sign 54 is coupled to the rear barrier bar 26. The rear sign 54 is coupled proximal the rear distal end 30 between the two rear lights 50. The rear sign 54 is diamond-shaped and has rounded corners to resemble a standard traffic warning sign. The rear sign 54 has a rear text portion 56 and a reflective rear signal arrow 58. The rear text portion 56 may read "SLOW DOWN" or alternatively "MOVE OVER".

The side barrier apparatus 14 comprises a side mounting plate 60 configured to mount to the driver's side 22 of the emergency vehicle 20 proximal the trunk end 18. A side hinge 61 is coupled to the side mounting plate 60 and a side barrier bar 62 is coupled to the side hinge 62. The side hinge 62 allows the side barrier bar 62 to swing between a side stored position 64 adjacent the driver's side 22 of the emergency vehicle and an alternate side extended position 66 extending perpendicularly from the driver's side 22. The side barrier bar 62 has a side proximal end 68 coupled to the side hinge 62 and a side distal end 70. The side barrier bar 62 is straight and has a length less than a length of the rear barrier bar 26. A plurality of rectangular side lights 72 is coupled to a side backside 74 of the side barrier bar and is configured to be in operational communication with the electrical system of the emergency vehicle 20. In the side extended position 66 the side lights 72 thus face back towards oncoming traffic and in the side stored position 64 the side lights 72 are protected against the driver's side 22 of the emergency vehicle. A side sign 76 is coupled to the side barrier bar 62. The side sign 76 is coupled proximal the side distal end 70 between an outmost side light 78 of the plurality of side lights 72 and a group of three side lights 72. The side sign 76 also is diamond-shaped and has rounded corners. The side sign 76 has a side text portion 80 and a reflective side signal arrow 82. The side text portion 80 may read "SLOW DOWN" or alternatively "MOVE OVER" to direct oncoming traffic to stay clear of the emergency vehicle 20.

In use, the rear barrier apparatus 12 is moved to the rear extended position 40 or, alternatively, the side barrier apparatus 14 is moved to the side extended position 66 when the emergency vehicle 20 is pulled over on the side of the road. The respective rear lights 50 or the side lights 72 are then illuminated to attract attention and keep oncoming traffic clear.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An emergency vehicle foldable barrier assembly comprising
a rear barrier apparatus, the rear barrier apparatus comprising:
  a rear mounting plate, the rear mounting plate being configured to mount to a trunk end of an emergency vehicle adjacent a driver's side;
  a rear hinge coupled to the rear mounting plate;
  a rear barrier bar coupled to the rear hinge, the rear barrier bar having a rear proximal end coupled to the rear hinge and a rear distal end, the rear barrier bar having a curved portion proximal the rear proximal end configured to conform to the curvature of the trunk end of the emergency vehicle and a planar portion extending from the curved portion to the rear distal end; and
  a plurality of rear lights coupled to the rear barrier bar, the rear lights being coupled to a rear backside of the rear barrier bar and being configured to be in operational communication with an electrical system of the emergency vehicle; and
a side barrier apparatus, the side barrier apparatus comprising:
  a side mounting plate, the side mounting plate being configured to mount to the driver's side of the emergency vehicle proximal the trunk end;
  a side hinge coupled to the side mounting plate;
  a side barrier bar coupled to the side hinge, the side barrier bar having a side proximal end coupled to the side hinge and a side distal end, the side barrier bar having a length less than a length of the rear barrier bar; and
  a plurality of side lights coupled to the side barrier bar, the side lights being coupled to a side backside of the side barrier bar and being configured to be in operational communication with the electrical system of the emergency vehicle.

2. The emergency vehicle foldable barrier assembly of claim 1 further comprising a rear sign coupled to the rear barrier bar proximal the rear distal end and a side sign coupled to the side barrier bar proximal the side distal end.

3. The emergency vehicle foldable barrier assembly of claim 2 further comprising each of the rear sign and the side sign being diamond-shaped and having rounded corners.

4. The emergency vehicle foldable barrier assembly of claim 2 further comprising the rear sign having a rear text portion and a reflective rear signal arrow and the side sign having a side text portion and a reflective side signal arrow.

5. The emergency vehicle foldable barrier assembly of claim 1 further comprising the planar portion of the rear barrier bar comprising a downward section adjacent the curved portion, a lower section extending horizontally from the downward section, an upward section angling up from the lower section and mirroring the downward section, and an end section extending horizontally from the upward section.

6. The emergency vehicle foldable barrier assembly of claim 5 further comprising the plurality of rear lights comprising three rear lights coupled to the curved portion, three rear lights coupled to the lower section, and two rear lights coupled to the end section.

7. The emergency vehicle foldable barrier assembly of claim 1 further comprising each of the plurality of rear lights and the plurality of side lights being rectangular.

8. An emergency vehicle foldable barrier assembly comprising
a rear barrier apparatus, the rear barrier apparatus comprising:
- a rear mounting plate, the rear mounting plate being configured to mount to a trunk end of an emergency vehicle adjacent a driver's side;
- a rear hinge coupled to the rear mounting plate;
- a rear barrier bar coupled to the rear hinge, the rear barrier bar having a rear proximal end coupled to the rear hinge and a rear distal end, the rear barrier bar having a curved portion proximal the rear proximal end configured to conform to the curvature of the trunk end of the emergency vehicle and a planar portion extending from the curved portion to the rear distal end, the planar portion comprising a downward section adjacent the curved portion, a lower section extending horizontally from the downward section, an upward section angling up from the lower section and mirroring the downward section, and an end section extending horizontally from the upward section;
- a plurality of rectangular rear lights coupled to the rear barrier bar, the rear lights being coupled to a rear backside of the rear barrier bar and being configured to be in operational communication with an electrical system of the emergency vehicle, the plurality of rear lights comprising three rear lights coupled to the curved portion, three rear lights coupled to the lower section, and two rear lights coupled to the end section; and
- a rear sign coupled to the rear barrier bar, the rear sign being coupled proximal the rear distal end, the rear sign being diamond-shaped and having rounded corners, the rear sign having a rear text portion and a reflective rear signal arrow; and a side barrier apparatus, the side barrier apparatus comprising:
- a side mounting plate, the side mounting plate being configured to mount to the driver's side of the emergency vehicle proximal the trunk end;
- a side hinge coupled to the side mounting plate;
- a side barrier bar coupled to the side hinge, the side barrier bar having a side proximal end coupled to the side hinge and a side distal end, the side barrier bar having a length less than a length of the rear barrier bar;
- a plurality of rectangular side lights coupled to the side barrier bar, the side lights being coupled to a side backside of the side barrier bar and being configured to be in operational communication with the electrical system of the emergency vehicle; and
- a side sign coupled to the side barrier bar, the side sign being coupled proximal the side distal end, the side sign being diamond-shaped and having rounded corners, the side sign having a side text portion and a reflective side signal arrow.

\* \* \* \* \*